PARALLEL RECORDING SYSTEM FOR SEQUENTIAL INFORMATION

Filed June 22, 1967

INVENTORS.
GYULA L. SAMODAI &
RICHARD F. WEEKS
BY
Brumbaugh, Free, Graves & Donohue
their ATTORNEYS INVENTORS.
GYULA L. SAMODAI &
RICHARD F. WEEKS
BY
Brumbaugh, Free, Graves & Donohue
their ATTORNEYS United States Patent Office 3,475,761

Patented Oct. 28, 1969

3,475,761

PARALLEL RECORDING SYSTEM FOR SEQUENTIAL INFORMATION

Gyula L. Samodai, Danbury, and Richard F. Weeks, Bristol, Conn., assignors to Schlumberger Technology Corporation, Houston, Tex., a corporation of Texas Filed June 22, 1967, Ser. No. 648,048
Int. Cl. G01d 9/00, 9/42
U.S. Cl. 346—33 4 Claims

ABSTRACT OF THE DISCLOSURE

The particular embodiment described herein as illustrative of one form of the invention utilizes a fiber faceplate line scan tube to present sequentially received information in parallel form. For this purpose, the electron beam of the tube is deflected by signals from a step sequence signal generator which adds to the information signal voltage the voltage necessary to place the information in the proper channel on the face of the tube. A record medium driven past the face of the tube provides a continuous record of the sequentially received signals in parallel form.

In many instances, it is more economical and efficient to transmit several different types of information in sequential segments through a single channel than to transmit them simultaneously over separate parallel channels. For example, where telephone line transmission capable of carrying several thousand information elements per second on a single line is utilized, it is preferable to combine information from several channels, each providing only a few hundred information elements per second, for transmission over a single line in time shared sequence than to use several transmission lines. Moreover, in well logging operations, for example, involving a plurality of different types of information the information is often converted in a downhole instrument to sequential form for transmission to the earth's surface and, therefore, requires conversion to parallel form after receipt. Furthermore, even if the several types of information are transmitted in parallel form, parallel recording of them in the conventional manner requires a corresponding number of different information processing and recording devices.

Accordingly, it is an object of the present invention to provide a new and improved parallel recording system which overcomes the above-mentioned disadvantages.

Another object of the invention is to provide a new and improved recording system which converts sequential information to parallel form conveniently and economically.

These and other objects of the invention are attained by providing a fiber faceplate line scan cathode ray tube to receive the information in sequence and produce a horizontal line sweep in which the various types of information are presented in spaced relation, and a record medium transport arrangement for moving a record medium transversely to the line sweep direction so as to record the various types of information in parallel. In one embodiment of the invention, the fibers transmitting information to the plane of the record medium are optical fibers and the record medium used with the system is a photosensitive material.

Further objects and advantages of the invention will be apparent from a reading of the following description in conjunction with the accompanying drawings, in which.

Figure 1:
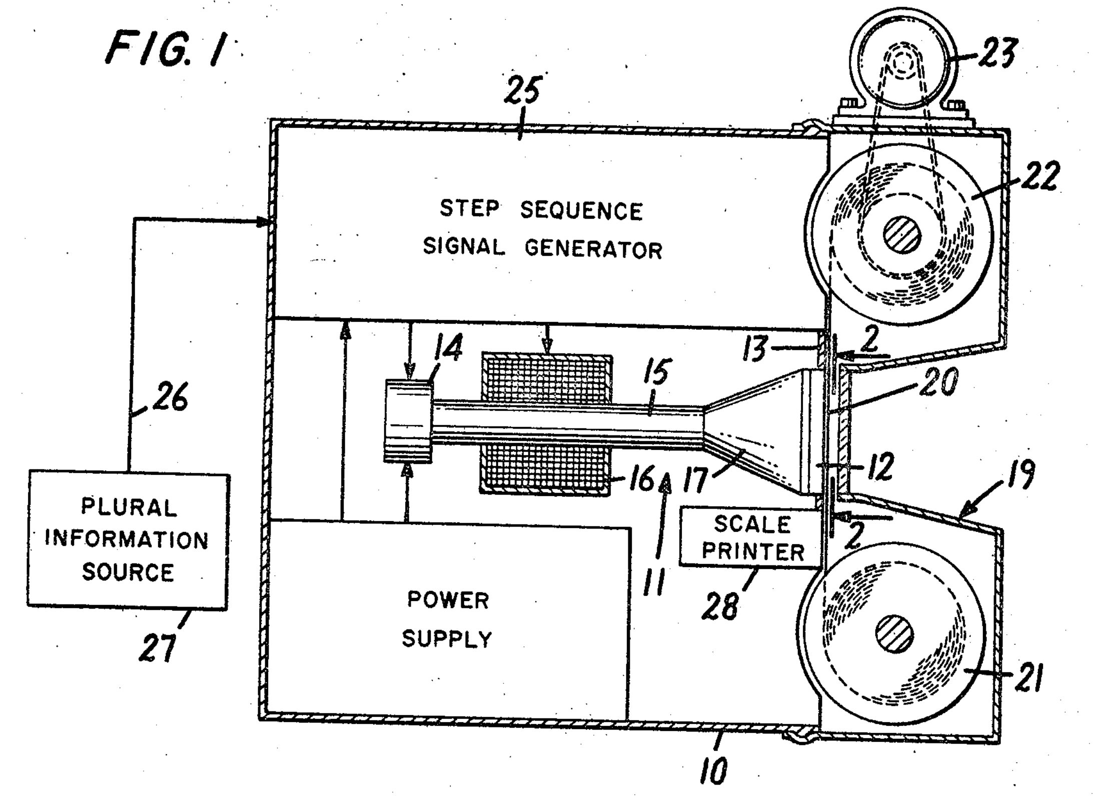
FIG. 1 is a schematic side view of a representative parallel recording system for sequential information arranged according to the invention.

In the representative embodiment of the invention shown in FIG. 1, a housing 10 encloses a fiber faceplate line scan tube 11 having its face 12 exposed through the front wall 13 of the housing. The fiber faceplate tube 11 may be of the type available under the number K2236 from the Dumont Laboratories Division of Fairchild Camera & Instrument Corp., or under the number GK1368 from the Raytheon Company, and includes an electrode portion 14 to which beam amplitude voltages are applied, an accelerating and deflecting tube portion 15 surrounded by a deflecting coil 16, and a fiber faceplate portion 17. In the fiber faceplate portion 17, each of a horizontally extending array of optical fibers 18, best seen in FIG. 2, has a front end disposed at the front surface 12 and a phosphorescent rear end adjacent to the tube portion 15, arranged to transmit light to the front end of the fiber when energized by the electron beam within the tube portion.

In order to record information represented by the illuminated ends of the fibers 18, a film cartridge 19, affixed to the front wall 13 of the recorder, draws a length of film 20 from a supply spool 21 to a pickup spool 22 across the face of the tube 11 in a direction perpendicular to the array of fibers 18. A drive motor 23 draws the film past the face of the tube at a speed related to the rate or repetition of information such that successive recordings of illumination of the same fiber will produce closely spaced or slightly overlapping record spots on the film. If for example, five types of information are received at a total rate of five thousand elements per second and the spot produced by illumination of a fiber is about 0.002 inch, then a film motion rate of two inches per second will produce contiguous spots.

Figure 2:
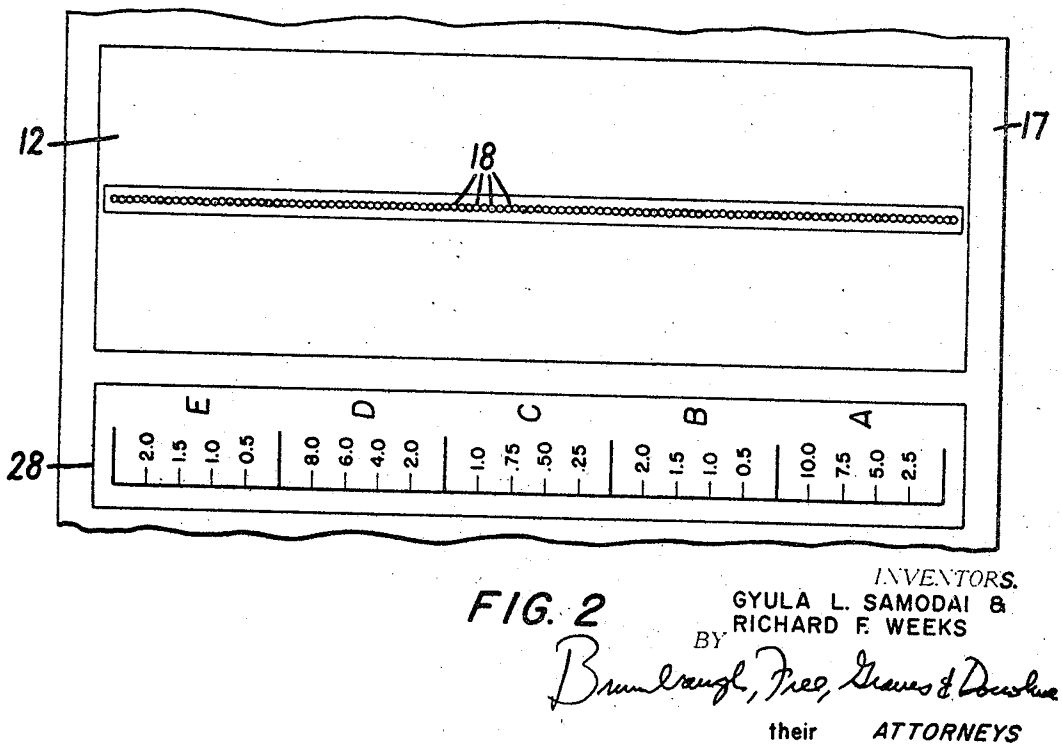
FIG. 2 is an enlarged fragmentary front view of the device of FIG. 1.

In order to illuminate the appropriate fibers for recording information, the deflecting coil 16 responds to signal from a step sequence signal generator 25 to deflect the electron beam in the tube so as to energize a corresponding one of the fibers 18 in accordance with each information signal received on a line 26 from a plural information source 27. The typical embodiment of the invention shown in the drawings is adapted to convert sequential signals representing five different types of information into five simultaneous amplitude representations of the information. For this purpose, a scale printer 28 having five adjacent uniform channel scales A, B, C, D and E extends across the width of the front wall 12 so as to print scale information as illustrated in FIG. 2. Each of the five scales A–E extends exactly one-fifth of the length of the array of fibers so that if there are, for example, one thousand fibers 18 each scale corresponds to a segment containing two hundred fiber ends.

In order to apply the various types of received information to the tube 11 in the appropriate manner, the step sequence signal generator converts each type of information received from the line 26 to a voltage which represents the amplitude level of the information. The received information is preferably in analog form but if digital information is presented, an appropriate digital-to-analog converter may be included. A representative step sequence signal generating arrangement is described hereinafter with reference to FIG. 3. If no scale changing devices are utilized, the range from the minimum to the maximum expected amplitude of the information corresponds to the two hundred fiber segment for that channel, reading from right to left as viewed in FIG. 2, each fiber representing 1/200 of the total range. If desired, however, conventional scale changing devices may be included in the apparatus so that a much larger range of amplitudes can be accommodated with the same sensitivity.

Furthermore, the signal generator 25 is arranged in a conventional manner to automatically add the proper voltage to the different types of information signals to present the information in the proper channel scale A–E. If, for example, the voltage producing the proper current in the coil 16 to deflect the electron tube beam from the extreme right-hand fiber 18 to the extreme left-hand fiber is 100 volts, i.e., one-tenth volt for each fiber, then the generator 25 automatically adds 20 volts to the signal level for each type of information in succession so as to place the information in the proper channel scale. A series of such signals is illustrated in FIG. 4*a*. At the same time that the electron beam is deflected to the proper position in each channel by the resulting current, the signal generator 25 applies a uniform amplitude pulse to the electrode head 14 to increase the beam amplitude sufficiently to illuminate the fiber momentarily, thereby recording a spot on the film 20. A corresponding series of such pulses is shown in FIG. 4*b*. After the fifth type of information has been presented in channel E, the signal generator output returns to the level for channel A and again presents the five sequential information elements in the proper channel locations by successively adding 20 volts to each of the information signals to produce the proper current in the coil 16.

As a result, the five types of information are presented in parallel in the channels A–E and, with successive presentations as the film is moved, the film record produces a continuous graphical represntation of the amplitude variations in the five types of information. If desired, reference marks may be added at periodic intervals by illuminating all of the fibers momentarily to indicate, for example, various depth levels in a well bore.

Figures 3, 4:
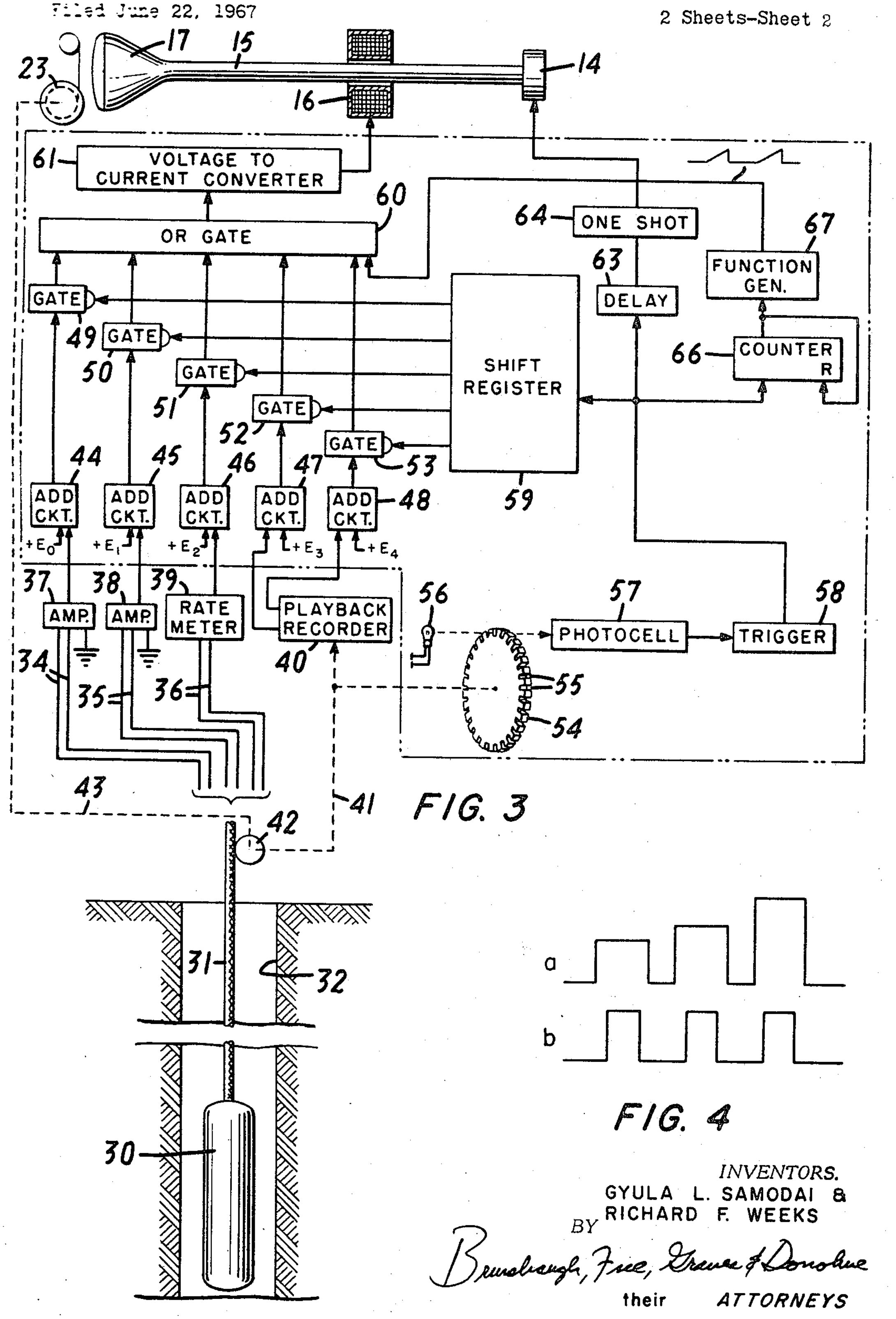
FIG. 3 is a schematic circuit diagram illustrating the invention in greater detail.
FIG. 4 is a graphical representation of the waveform of certain signals which is useful in explaining the operation of the system.

In the arrangement as shown in greater detail in FIG. 3, a well logging instrument 30, suspended by a multiconductor cable 31 in a well bore 32, contains a plurality of investigating tools (not shown) such as a caliper log device, an electrode log device, an induction log device, a sonic log device, etc. The signals from the various downhole investigating devices are transmitted to the surface of the earth through corresponding conductor pairs 34, 35 and 36 to two amplifiers 37 and 38 and a suitable rate meter 39. The amplifiers may, for example, be differential amplifiers supplying a ground reference for the uphole equipment in connection with electrode log signals, induction log signals and the like. Moreover, the rate meter may be a filter type storage device which accumulates pulse signals from gamma ray, neutron or sonic log devices or the like and produces an output signal representing the rate of receipt of such pulses.

In addition, a playback recorder 40 is included to provide for the simultaneous recording of previously recorded logs for comparison purposes. The playback recorder 40 is driven through a mechanical linkage 41 from a wheel 42 which is rotated by motion of the cable 31 so as to assure depth coincidence between the current and previously recorded logs, the wheel 42 also being connected through a linkage 43 to the film drive motor 23. If desired, depth shifting may be accomplished by inserting appropriate memory devices (not shown) in the output of one or more of the devices 37–40.

The analog output signals of the amplifiers 37 and 38, the rate meter 39 and the playback recorder 40 are supplied to corresponding adding circuits 44–48 where fixed voltages $E_0$, $E_1$, $E_2$, $E_3$ and $E_4$ are added to the analog signals, the voltages being selected as described above to place the information in the proper channel in the tube 11. The outputs of the adding circuits are applied to corresponding gate circuits 49, 50, 51, 52 and 53.

In order to control the gate circuits 49–53, the cable driven wheel 42 is joined by the mechanical linkage 41 to drive a disk 54 provided with uniformly spaced peripheral slots 55. A light source 56 on one side of the wheel 54 is arranged to illuminate a photocell 57 on the opposite side intermittently through the slots as the wheel rotates. As a result, the photocell provides a pulse to a trigger 58 at selected depth intervals as the logging instrument 30 moves through the well 32. The trigger 58 is a conventional wave shaping device such as a Schmitt trigger and, if desired, it may also include a one-shot multivibrator to make certain that all of the output pulses have the same width.

The output signals from the trigger 58 cause a conventional shift register 59 to provide actuating pulses to the gates 49–53 in succession. If desired, a ring counter may be used to perform the function of the shift register. As a result, each of the gates is opened in succession to transmit a voltage corresponding to the desired beam deflection current in the coil 16, i.e., the analog logging signal plus the bias signal, to an OR gate 60 having an output connected through a voltage-to-current converter 61 to the coil 16.

The output signal from the trigger 58 is also applied through a delay unit 63 and a one-shot multivibrator 64 to the electrode portion 14 of the tube 11 to produce a momentary increase in the beam intensity at the appropriate time, i.e., when the beam has been deflected to the proper position. As previously mentioned, FIG. 4*a* shows a representative succession of current signals applied to the deflecting coil 16 and FIG. 4*b* illustrates the corresponding beam intensity pulses applied to the electrode portion 14. In this manner, any switching transients influencing the coil 16 do not affect the record made on the film.

To provide periodic depth marks on the film record, the pulse signals from the trigger 58 are supplied to a counter 66 which accumulates a given count corresponding, for example, to a ten foot depth interval and then supplies a function generator 67 with an actuating signal. The function generator 67 then applies a constantly increasing signal to the OR gate 60 for an interval equal to the time interval of the one-shot 64. The minimum and maximum signal voltages provided by the function generator waveform are arranged to correspond to the voltages required to deflect the beam from one side to the other of the fiber array. If the output of the counter 66 is a constant amplitude signal, the function generator 67 may, for example, be a simple integrator. Moreover, the printing of the depth marks may be timed to coincide with the resetting interval of the shift register.

In operation, signals representing several different types of information are applied from the instrument 30 through the cable 31 to the amplifiers 37 and 38 and the meter 39. At the same time, the playback recorder 40 is operative to produce two further signals. The adding circuits 44–48 add the appropriate voltage to each signal to locate it in the proper segment or channel of the array of fibers 18. At the same time, the film 20 within the cartridge 19 is drawn by the drive motor 23 across the face of the tube in conjunction with the motion of the instrument 30 so as to record the various types of information in parallel as a function of instrument depth. Thereafter, the film is processed in the usual manner to produce a permanent record.

Although the invention has been described herein with reference to a specific embodiment, many modifications and variations therein will readily occur to those skilled in the art. For example, instead of utilizing a fiber face-plate tube having optical fibers to transmit light to a photosensitive film, a tube having electrically conductive fibers or wires may be substituted and a charge receptive record medium such as paper may be used, along with conventional electrostatic image developing techniques, Moreover, if desired, the information applied to the system may be multiplexed information transmitted by way of a transmission line or radio signals, rather than being received through a cable directly from a logging insrument. In this case, the received information would contain or be used to produce synchronizing signals to energize the shift register 59 rather than the slotted disk 54.

We claim:

1. Apparatus for recording well logging information as a function of borehole depth, comprising:

(a) fiber faceplate line scan means for producing a radiant energy beam and directing said beam toward the face of the line scan means, said line scan means having deflection means for deflecting the beam along a straight line across said face and beam control means for causing the beam to illuminate said face;

(b) means for deriving signals representative of at least one subsurface characteristic over a selected borehole depth interval;

(c) a longitudinally extending record medium positioned to receive energy from the face of the line scan means and adapted to move along said longitudinal axis as a function of borehole depth;

(d) means for deriving depth pulses, each pulse representing a given depth increment;

(e) control means responsive to the depth pulses for causing a record of said at least one derived signal to be reproduced on the record medium, said control means including sampling means for sampling said at least one derived signal at selected depth intervals, means responsive to the depth pulses and the sampled signals for energizing the deflection means to deflect the beam along a straight line across the face of the line scan means transversely of the longitudinal axis of the record medium to a position representative of the amplitude of the sample signal and momentarily energizing said beam control means so that energy will repetitively strike said record medium at points which are spaced as a function of borehole depth along the length of the record medium and which are transversely located in accordance with the sampled signal amplitude.

2. Apparatus according to claim 1 wherein said means responsive to the depth pulses and the sampled signals includes means for applying the sampled signals to the deflection means to cause deflection of the beam along a straight line across the face of the line scan means, along with means responsive to selected depth pulses for momentarily energizing the beam control means as the beam is deflected along the straight line across the face of the line scan means.

3. Apparatus for recording well logging information as a function of borehode depth, comprising:

(a) fiber faceplate line scan means for producing a radiant energy beam and directing said beam toward the face of the line scan means, said line scan means having deflection means for deflecting the beam along a straight line across said face and beam control means for causing the beam to illuminate said face;

(b) means for deriving a plurality of signals representative of a plurality of subsurface characteristics over a selected borehole depth interval;

(c) a longitudinally extending record medium positioned to receive energy from the face of the line scan means and adapted to move longitudinally as a function of borehole depth;

(d) means for deriving depth pulses, each pulse representing a given depth increment;

(e) control means responsive to the depth pulses for causing records of said derived signals to be reproduced on the record medium, said control means including sampling means for sequentially sampling said derived signals at selected depth intervals, means responsive to the depth pulses and the sampled signals for repetitively energizing the deflection means to deflect the beam along a straight line across the face of the line scan means transversely of the longitudinal axis of the record medium to positions representative of the amplitudes of the sampled signals and momentarily energizing said beam control means for each sampled signal so that energy will repetitively strike said record medium at points which are spaced as a function of borehole depth along the length of the record medium and which are transversely located in accordance with the amplitudes of the sampled signals.

4. Apparatus according to claim 3 wherein said means responsive to the depth pulses and the sampled signals includes means for applying the sequentially sampled signals to the deflection means to cause deflection of the beam along a straight line across the face of the line scan means, along with means responsive to selected depth pulses for momentarily energizing the beam control means as the beam is deflected along the straight line across the face of the line scan means.

References Cited

UNITED STATES PATENTS

| | | | |
|---|---|---|---|
| 3,284,766 | 11/1966 | Sterry | 346—110 X |
| 3,289,196 | 11/1966 | Hull | 346—110 X |
| 3,324,451 | 6/1967 | Richard | 346—110 X |
| 3,348,229 | 10/1967 | Freas | 346—23 |
| 3,321,741 | 5/1967 | Crossland | 340—15.5 |
| 3,333,237 | 7/1967 | Chapman | 340—15.5 |

JOSEPH W. HARTARY, Primary Examiner

U.S. Cl. X.R.

340—15.5; 346—23, 110